United States Patent
Aso

(10) Patent No.: US 7,863,838 B2
(45) Date of Patent: Jan. 4, 2011

(54) POWER SUPPLY SYSTEM PROVIDED WITH A PLURALITY OF POWER SUPPLIES, AND VEHICLE PROVIDED WITH SUCH POWER SUPPLY SYSTEM

(75) Inventor: Shinji Aso, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 691 days.

(21) Appl. No.: 11/887,423

(22) PCT Filed: Apr. 3, 2006

(86) PCT No.: PCT/JP2006/307511
§ 371 (c)(1),
(2), (4) Date: Sep. 28, 2007

(87) PCT Pub. No.: WO2006/107109
PCT Pub. Date: Oct. 12, 2006

(65) Prior Publication Data
US 2010/0194318 A1    Aug. 5, 2010

(30) Foreign Application Priority Data
Apr. 4, 2005    (JP) .............................. 2005-107124

(51) Int. Cl.
*B60L 11/18* (2006.01)
*H02J 7/34* (2006.01)
*G05F 1/46* (2006.01)

(52) U.S. Cl. ...................... 318/139; 318/109; 318/112; 307/151; 363/123

(58) Field of Classification Search .......... 318/105–113, 318/139; 307/9.1, 10.1, 151; 363/13, 15, 363/59, 74, 123
See application file for complete search history.

(56) References Cited

U.S. PATENT DOCUMENTS

| | | | |
|---|---|---|---|
| 5,309,073 A * | 5/1994 | Kaneko et al. | 318/500 |
| 5,549,172 A | 8/1996 | Mutoh et al. | |
| 6,255,008 B1 | 7/2001 | Iwase | |
| 6,583,519 B2 * | 6/2003 | Aberle et al. | 307/10.1 |
| 6,615,940 B2 | 9/2003 | Morisawa | |
| 6,847,127 B1 * | 1/2005 | Lee | 290/40 C |
| 6,893,757 B2 | 5/2005 | Kato | |
| 6,920,948 B2 | 7/2005 | Sugiura et al. | |
| 6,975,091 B2 * | 12/2005 | Lee et al. | 320/104 |
| 7,026,783 B2 * | 4/2006 | Eckardt | 318/400.3 |
| 7,053,500 B2 * | 5/2006 | Furukawa et al. | 307/10.6 |
| 2003/0128001 A1 * | 7/2003 | Pabst et al. | 318/105 |
| 2004/0069548 A1 | 4/2004 | Kira et al. | |

FOREIGN PATENT DOCUMENTS

| | | |
|---|---|---|
| JP | 7-15804 A | 1/1995 |
| JP | 10-056701 | 2/1998 |

(Continued)

*Primary Examiner*—Bentsu Ro
(74) *Attorney, Agent, or Firm*—Kenyon & Kenyon LLP

(57) ABSTRACT

A power supply system is provided with a plurality of driving motors, a power converter, and a plurality of power supplies which supply the driving motors with power and have different output voltages. Each power supply is connected with at least one driving motor through the power converter and with at least one driving motor through a path which does not include the power converter.

18 Claims, 7 Drawing Sheets

FOREIGN PATENT DOCUMENTS

| | | |
|---|---|---|
| JP | 2000-036308 A | 2/2000 |
| JP | 2001-204107 A | 7/2001 |
| JP | 2002-118981 A | 4/2002 |
| JP | 2002-231287 A | 8/2002 |
| JP | 2003-033013 A | 1/2003 |
| JP | 2003-333707 A | 11/2003 |
| JP | 2004-112956 A | 4/2004 |
| JP | 2004-135371 A | 4/2004 |
| JP | 2004-350478 A | 12/2004 |
| JP | 2004-364350 A | 12/2004 |
| JP | 2005-050758 A | 2/2005 |

\* cited by examiner

POWER SUPPLY SYSTEM PROVIDED WITH A PLURALITY OF POWER SUPPLIES, AND VEHICLE PROVIDED WITH SUCH POWER SUPPLY SYSTEM

This is a national phase application of PCT/JP2006/307511 filed 3 Apr. 2006, claiming priority to Japanese Patent Application No. 2005-107124 filed 4 Apr. 2005, the contents of which are incorporated herein by reference.

TECHNICAL FIELD

The present invention relates to an electric power supply system with a plurality of electric power supplies and a vehicle provided with such an electric power supply system.

BACKGROUND ART

In recent years, electric automobiles and hybrid automobiles driven by motors using electric power supplies such as a fuel cell have been developed. A fuel cell is a cell which obtains electric energy by, for example, supplying fuel gas such as hydrogen and oxidant gas such as oxygen to an electrolyte film. The fuel cell has a high power-generating efficiency, and has attracted attention as an environmentally friendly electric power supply.

In some cases, vehicles with a fuel cell are provided with a battery such as a secondary cell in addition to the fuel cell, in consideration of possible loss of electric power supply from the fuel cell or of reduced response from the fuel cell. For example, an electric power supply system having a battery connected to a motor in parallel with a fuel cell has been disclosed. In such a case, where a battery is disposed in parallel with a fuel cell, a DC-DC converter is generally provided between the battery and the motor for matching the voltages of the fuel cell and the battery or for retrieving regenerated energy.

DISCLOSURE OF THE INVENTION

Object of the Invention

In the above described background art, electric power is always supplied from a battery to a motor via a DC-DC converter. Further, in many cases, when regenerated energy from a motor is recovered in the battery, electric power is retrieved via the DC-DC converter. In such a configuration, a power loss occurs at the DC-DC converter, which reduces the vehicle efficiency.

Moreover, in the even of a malfunction in a semiconductor element in a DC-DC converter, an output of a fuel cell or battery may become abnormally high, increasing the likelihood that an abnormal state will occur in the fuel cell or battery. For example, when a battery is connected to a motor only via a DC-DC converter and operation of both the DC-DC converter and the fuel cell are suspended at the same time due to trouble or malfunction, a problem occurs that the suspension of electric power supply to a motor disables the vehicle.

An object of the present invention is to provide an electric power supply system and a vehicle provided with such an electric power supply system which resolves at least one of the problems of the above described background art.

Means for Achieving the Object

An aspect of the present invention is an electric power supply system which includes multiple drive motors, an electric power converter for converting a DC voltage, multiple electric power supplies with mutually different output voltages for supplying electric power to the multiple drive motors. Each of the electric power supplies is connected to at least one of the multiple drive motors not via the electric power converter, while also being connected to at least one of the multiple drive motors via the electric power converter.

BEST MODE FOR CARRYING OUT THE INVENTION

Configuration

Figure 1:
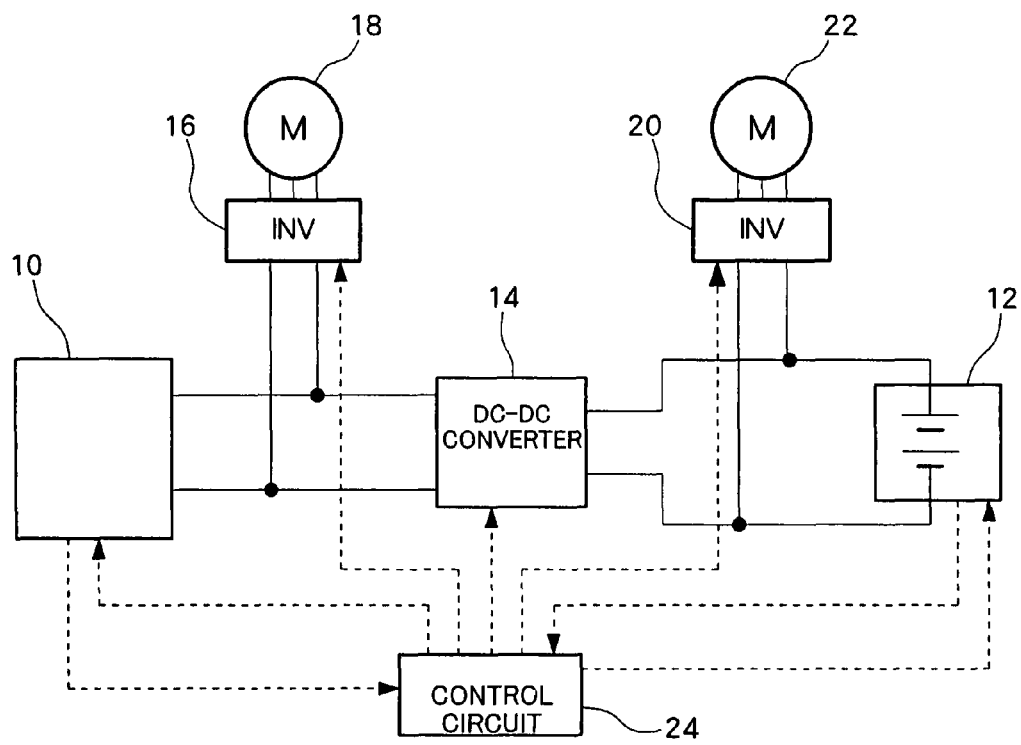
FIG. 1 is a configuration diagram of an electric power supply system according to an embodiment of the present invention.

As shown in FIG. 1, an electric power supply system 100 of one embodiment of the present invention is configured to include a first electric power supply 10, a second electric power supply 12, a voltage converter 14, a first inverter circuit 16, a first motor 18, a second inverter circuit 20, a second motor 22, and a control circuit 24. The electric power supply system 100 can be applied to a vehicle which is driven by using at least one of the first motor 18 and the second motor 22 as a drive source with the first electric power supply 10 and the second electric power supply 12. The configuration of this embodiment can be also applied to a hybrid automobile provided further with an engine.

The first electric power supply 10 is a DC power supply which in this embodiment is used as a primary power source for the electric power supply system 100. The first electric power supply 10 can be a fuel cell which obtains electric energy by supplying fuel gas such as hydrogen and oxidant gas such as oxygen to an electrolyte film. Applicable types of fuel cell include polymer electrolyte cells, phosphoric-acid cells, molten carbonate cells, or the like, but are not limited to these types. As the first electric power supply 10, various types of electric power generation means (such as an engine-driven electric generator) which have sufficient capacity for stable motor driving can be applied.

The first electric power supply 10 is configured such that output power can be controlled using a control signal from the control circuit 24. The output power can be controlled by a conventional controlling method, for example, by controlling factors such as the amount of fuel gas or oxidant gas supplied into the first electric power supply 10, or the water content of the fuel gas or oxidant gas. Further, the first electric power supply 10 is provided with a voltage sensor, electric current sensor, or the like. These sensors measure power output from the first electric power supply 10, and a measurement signal is output to the control circuit 24.

The second electric power supply 12 is a DC power supply which is used as an auxiliary power supply of the electric power supply system 100 in this embodiment. In many cases, the second electric power supply 12 is an electric power supply having a different output voltage from the output voltage of the first electric power supply 10. The second electric power supply 12 is preferably a secondary cell which can charge and discharge regenerated energy from a motor and an excessive electric power from the first electric power supply 10. As the secondary cell, cell types such as nickel-hydrogen type and lithium-ion type can be employed, but the cells are not limited to cells of these types. Various types of electric power supplies can be used as the second electric power supply 12.

Further, the second electric power supply 12 is configured in such a manner that output power can be controlled using a control signal from the control circuit 24. The output power can be controlled by a conventional control method, such as, for example, by controlling a resistance value of a resistor connected in series to the second electric power supply 12. The second electric power supply 12 is provided with a voltage sensor, electric current sensor, or the like. These sensors measure power output from the second electric power supply 12, and a measurement signal is output to the control circuit 24.

The first inverter circuit 16 and the second inverter circuit 20 are configured to respectively include a circuit for converting DC power into three-phase AC power. The first inverter circuit 16 and the second inverter circuit 20 are configured such that a DC-AC conversion can be started and stopped by a control signal from the control circuit 24. For example, the first inverter circuit 16 is started or stopped according to output power from the first electric power supply 10, while the second inverter circuit 20 is started or stopped according to output power from the second electric power supply 12.

The first motor 18 and the second motor 22 are synchronous motors driven respectively by receiving three-phase AC power. The first motor 18 and the second motor 22 are configured such that they can be started or stopped by a control signal from the control circuit 24. For example, the first motor 18 is started and stopped according to output power from the first electric power supply 10, while the second motor 22 is started and stopped according to output power from the second electric power supply 12.

The first electric power supply 10 is connected to the first motor 18 via the first inverter circuit 16. DC power supplied from the first electric power supply 10 is converted into three-phase AC power by the first inverter circuit 16 before it is supplied to the first motor 18. Similarly, the second electric power supply 12 is connected to the second motor 22 via the second inverter circuit 20. DC power supplied from the second electric power supply 12 is converted into three-phase AC power by the second inverter circuit 20 before being supplied to the second motor 22.

Outputs from the first motor 18 and the second motor 22 are transmitted to an axle of a vehicle via a transmission, clutch, or the like which is used for changing a rotational ratio. For example, a four-wheel drive vehicle can be configured by using the first motor 18 for driving the front wheels and the second motor 22 for driving the rear wheels.

The voltage converter 14 is configured, depending on types of connected electric power supply and motor, to include a DC voltage conversion circuit such as a DC-DC converter, or a DC-AC voltage converter such as a DC-AC converter. As in this embodiment, if the first electric power supply 10 is a fuel cell, the second electric power supply 12 is a secondary cell, and the first motor 18 and second motor 22 are DC motors, a DC-DC converter is used as the voltage converter 14. The voltage converter 14 is configured so that a voltage conversion can be started and stopped by a control signal from the control circuit 24. For example, the voltage converter 14 is started and stopped according to an output voltage from the first electric power supply 10 or the second electric power supply 12.

The first electric power supply 10 and the second electric power supply 12 are connected to each other via the voltage converter 14. The first electric power supply 10 and the second electric power supply 12 are connected each other via the voltage converter 14 such that they are connected with the first motor 18 and the second motor 22, respectively, in parallel. The voltage converter 14 matches the output voltage from the first electric power supply 10 to the output voltage from the second electric power supply 12 before supplying the electric power to the second inverter circuit 20, while the voltage converter 14 also matches the output voltage from the second electric power supply 12 to the output voltage from the first electric power supply 10 before it supplies the electric power to the first inverter circuit 16. Thus, the voltage converter 14 is used for connecting multiple electric power supplies with mutually different output voltages.

The control circuit 24 integratedly controls the electric power supply system 100. The control circuit 24 can be configured by a micro-computer having a CPU and a memory (semiconductor memory such as a RAM or ROM). The control circuit 24 receives a measurement signal indicating output power of the first electric power supply 10 and the second electric power supply 12, and controls respective components based on the received signal. The control circuit 24 also receives a signal from a position sensor or the like installed on an accelerator pedal (not shown) to calculate an amount of electric power required from the electric power supply system 100. The control circuit 24 adjusts electric power supplied to the first motor 18 and the second motor 22 by controlling the first electric power supply 10, second electric power supply 12, and voltage converter 14 based on the calculated required electric power.

Control in Normal Condition

Figure 2:
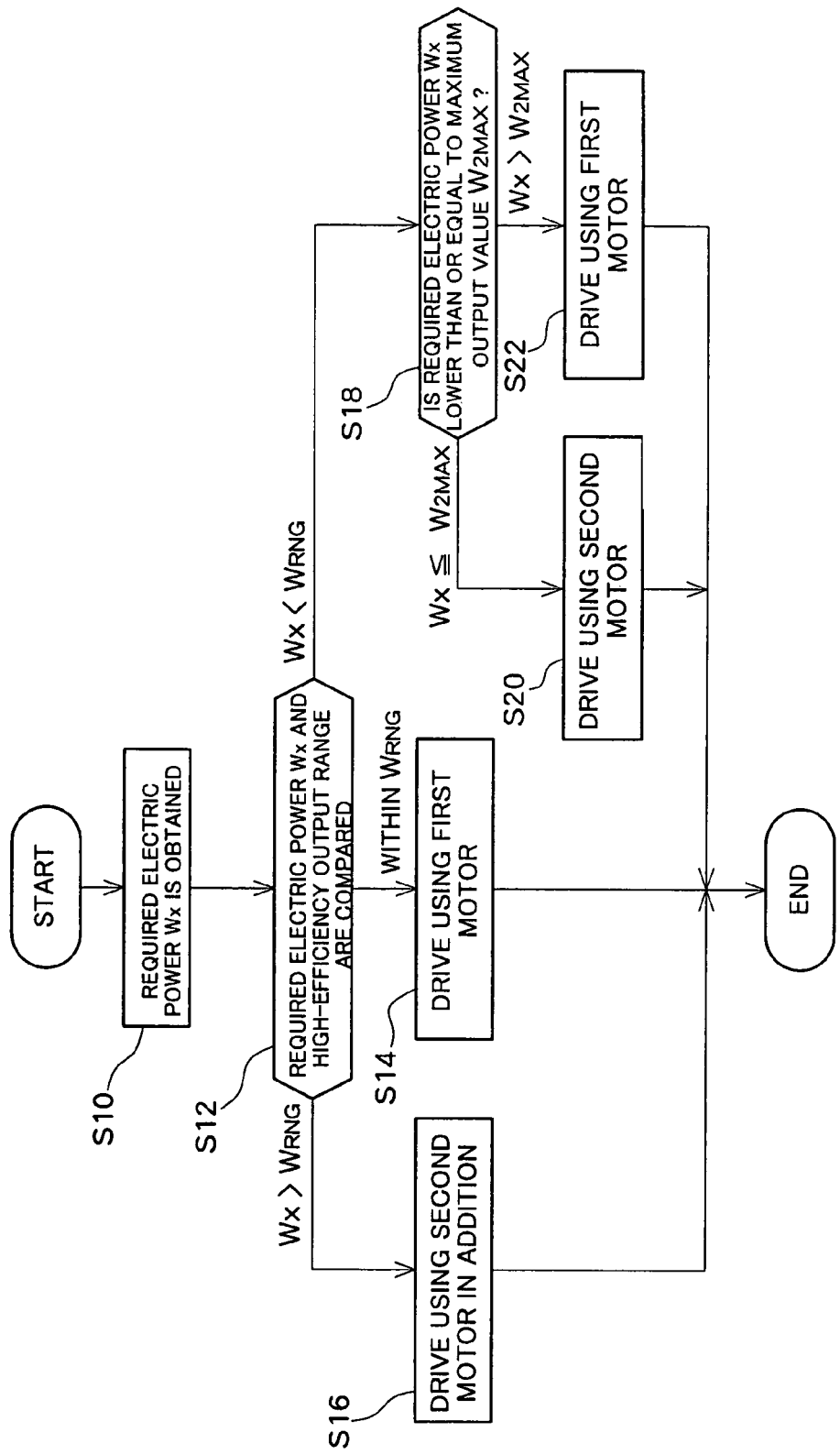
FIG. 2 is a flow chart showing a control of an electric power supply system according to an embodiment of the present invention.

Next, an example of control during normal driving will be explained while referring to the flowchart shown in FIG. 2.

In step S10, the control circuit 24 obtains required electric power. The control circuit 24 calculates required electric power Wx required for the electric power supply system 100 based upon a received signal indicating the position of the accelerator pedal (not shown) measured by a position sensor or the like. The calculation of the required electric power Wx can be performed by applying a conventional technique.

At step S12, it is determined whether the calculated required electric power Wx is within a high-efficiency output range of the first electric power supply 10 which is used as a primary power supply. The control circuit 24 refers to an output-efficiency relational table of the first electric power supply 10 which is stored and held in a memory to check whether the required electric power Wx calculated in step S10 is within a predetermined high-efficiency output range $W_{RNG}$. The output-efficiency relational table of the first electric power supply 10 is preferably measured and stored in the memory in advance.

Figure 3:
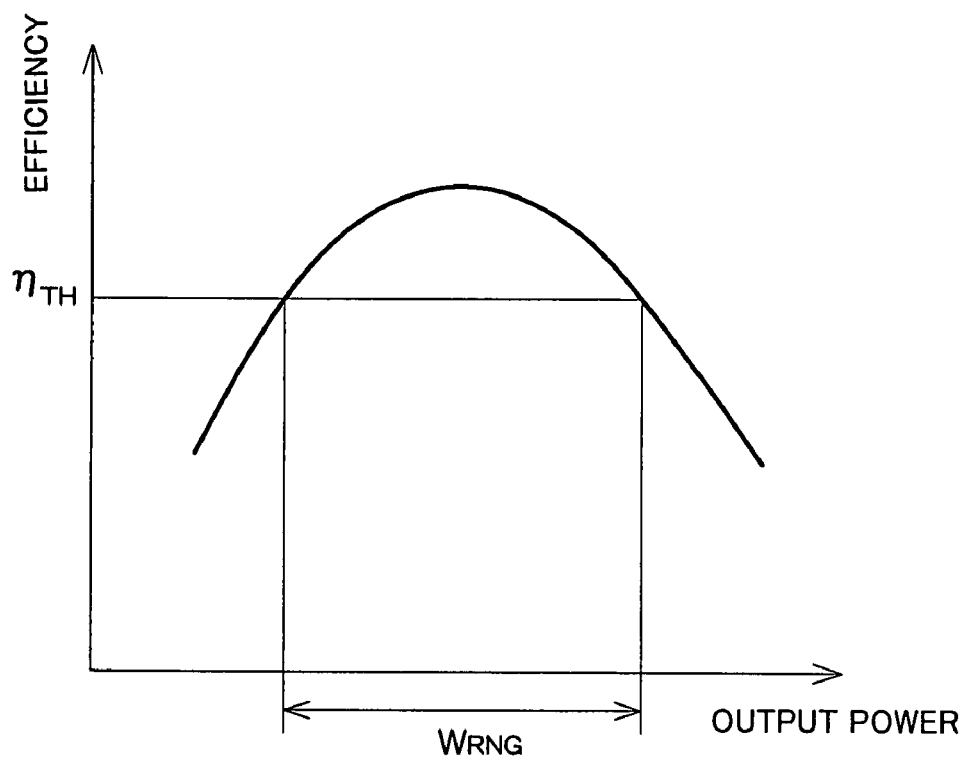
FIG. 3 is a diagram showing a relationship between output power and efficiency of a general electric power supply.

Generally, output power and an efficiency of the first electric power supply 10 relate as shown in the graph of FIG. 3.

That is, in an output power range lower than the maximum efficiency point, the efficiency gradually increases as output power increases, while in an output power range higher than the maximum efficiency point, the efficiency is gradually reduced as output power increases. An output power range higher than a predetermined efficiency $\eta_{TH}$ is defined as a high-efficiency output range $W_{RNG}$. If the first electric power supply 10 is a fuel cell, the high-efficiency output range $W_{RNG}$ is preferably in a range of 7% to 30% of the maximum output.

The control circuit 24 instructs to proceed a process to step S14 if the required electric power Wx is within the predetermined high efficiency range $W_{RNG}$, to step S16 if the required electric power Wx is higher than the predetermined high efficiency range $W_{RNG}$, and to step S18 if the required electric power Wx is lower than the predetermined high efficiency range $W_{RNG}$.

At step S14, the first motor 18 is driven by supplying electric power from the first electric power supply 10. The control circuit 24 instructs the first electric power supply 10, by sending a control signal to the first electric power supply 10, to supply DC power of required electric power Wx to the first inverter circuit 16 because the required electric power Wx is within the high-efficiency output range $W_{RNG}$ of the first electric power supply 10. If the first electric power supply 10 is a fuel cell, a control can be performed so that the required electric power Wx is output, for example, by controlling a flow rate of fuel gas or oxidant gas. The first inverter circuit 16 converts the DC power to three-phase AC power before supplying the electric power to the first motor 18. In this way, a required drive force is supplied from the first motor 18.

In this process, because the electric power is supplied without transmission through the voltage converter 14, the reduced efficiency caused by power consumption at the voltage converter 14 can be avoided.

For a four wheel drive vehicle, the second motor 22 may be driven by supplying electric power from the first electric power supply 10 via the voltage converter 14 as required. The control circuit 24 then distributes output power from the first electric power supply 10 to the first inverter circuit 16 and to the second inverter circuit 20 at a desired ratio by controlling a voltage conversion of the voltage converter 14. In such a case, because electric power is supplied to the second motor 22 via the voltage converter 14, the overall efficiency is less than when only the first motor 18 is used.

Further, electric power excessively supplied from the first electric power supply 10 may be used to recharge the second electric power supply 12 via the voltage converter 14. Regenerated energy from the first motor 18 may be also used to recharge the second electric power supply 12 via the voltage converter 14.

At step S16, driving is performed using both the first electric power supply 10 and the second electric power supply 12. That is, electric power is supplied to multiple drive motors from multiple electric power supplies in such a manner that the maximum output voltage of each of the multiple electric power supplies is not exceeded, and without using the voltage converter. The control circuit 24 assigns the required electric power Wx for output to the first electric power supply 10 and to the second electric power supply 12, because the required electric power Wx is higher than the high-efficiency output range $W_{RNG}$ of the first electric power supply 10.

For example, the control circuit 24 instructs the second electric power supply 12, by sending a control signal to the second electric power supply 12, to output the maximum output value $W_{2MAX}$ which can be output by a combination of the second electric power supply 12 and the second motor 22.

The maximum output value $W_{2MAX}$ which can be output by a combination of the second electric power supply 12 and the second motor 22 is preferably measured in advance and stored in the memory of the control circuit 24. If the second electric power supply 12 is a secondary cell, the maximum output value $W_{2MAX}$ may be preferably determined based on a charge status, because the maximum output value $W_{2MAX}$ changes depending on the charge status. For example, a relationship between an output voltage and the maximum output value $W_{2MAX}$ is preferably pre-measured and stored in advance. The control circuit 24 can determine the maximum output value $W_{2MAX}$ based on an output voltage of the second electric power supply 12. The second inverter circuit 20 converts DC power to three-phase AC power before supplying the electric power to the second motor 22. The control circuit 24 instructs the first electric power supply 10, by sending a control signal to the first electric power supply 10, to output power $W_{D1}$ which is a difference obtained by subtracting the maximum output value $W_{2MAX}$ from the required electric power Wx. The first inverter circuit 16 converts DC power to three-phase AC power before supplying the electric power to the first motor 18. In this manner, a drive force corresponding to the required electric power Wx is supplied from the first motor 18 and the second motor 22.

Control may also be preferably performed in the following manner. The control circuit 24 instructs the first electric power supply 10, by sending a control signal to the first electric power supply 10, to output the maximum efficiency power $W_H$ with which the efficiency of the first electric power supply 10 reaches maximum. The first inverter circuit 16 converts DC power to three-phase AC power before supplying the electric power to the first motor 18. The control circuit 24 instructs the second electric power supply 12, by sending a control signal to the second electric power supply 12, to output power $W_{D2}$ which is a difference obtained by subtracting the maximum efficiency power $W_H$ from the required electric power Wx. The second inverter circuit 20 converts DC power to three-phase AC power before supplying the electric power to the second motor 22. In this way, a drive force corresponding to the required electric power Wx is supplied from the first motor 18 and the second motor 22. If the power $W_{D2}$ is greater than the maximum output value $W_{2MAX}$ which can be output by a combination of the second electric power supply 12 and the second motor 22, the excessive electric power may be assigned to a combination of the first electric power supply 10 and the first motor 18.

With this process, because the electric power can be supplied while avoiding the voltage converter 14, a drop in efficiency caused by power consumption at the voltage converter 14 can be avoided.

Control is preferably performed in such a manner that the maximum efficiency can be obtained by the system as a whole by taking into account the single cell efficiency of the fuel cell (the first electric power supply 10), charge and discharge efficiency of the secondary cell (the second electric power supply 12), and conversion efficiency of the voltage converter 14. That is, the electric power is preferably supplied via the voltage converter 14 if the efficiencies of the first electric power supply 10 and the second electric power supply 12 are increased beyond the efficiency loss when electric power is supplied via the voltage converter 14.

At step S18, it is determined whether or not the required electric power Wx is less than or equal to the maximum output value $W_{2MAX}$ which can be output by a combination of the second electric power supply 12 and the second motor 22. The control circuit 24 determines whether the required electric power Wx calculated in step S10 is lower than or equal to the maximum output value $W_{2MAX}$, and instructs the process to precede to step S20 when the required electric power Wx is less than or equal to the maximum output value $W_{2MAX}$, and to step S22 when the required electric power Wx is greater than the maximum output value $W_{2MAX}$.

At step S20, the second motor 22 is driven by supplying electric power from the second electric power supply 12. The control circuit 24 instructs the second electric power supply 12, by sending a control signal to the second electric power supply 12, to supply DC power of the required electric power Wx to the second inverter circuit 20, because the required electric power Wx is lower than or equal to the maximum output value $W_{2MAX}$. The second inverter circuit 20 converts the DC power to three-phase AC power before supplying the electric power to the second motor 22. In this way, a required drive force is supplied from the second motor 22.

In this process, because the electric power can be supplied while avoiding the voltage converter 14, the reduction in efficiency caused by power consumption at the voltage converter 14 can be avoided.

Also in this case, control is preferably performed such that the maximum efficiency can be obtained by the system as a whole by taking into account the single cell efficiency of the fuel cell (the first electric power supply 10), the charge and discharge efficiency of the secondary cell (the second electric power supply 12), and the conversion efficiency of the voltage converter 14.

For a four wheel drive, the first motor 18 may be driven by supplying electric power from the second electric power supply 12 via the voltage converter 14 as required. The control circuit 24 controls the voltage conversion of the voltage converter 14 to distribute an output voltage from the second electric power supply 12 to the first inverter circuit 16 and to the second inverter circuit 20 at a desired ratio. In such a case, because the electric power is supplied to the first motor 18 via the voltage converter 14, the overall efficiency may be less than the efficiency when only the second motor 22 is used.

At step S22, the first motor 18 is driven by supplying electric power from the first electric power supply 10. The control circuit 24 instructs the first electric power supply 10, by sending a control signal to the first electric power supply 10, to supply DC power of the required electric power Wx to the first inverter circuit 16, because the required electric power Wx is higher than the maximum output value $W_{2MAX}$. The first inverter circuit 16 converts the DC power to three-phase AC power before supplying the electric power to the first motor 18. In this manner, a required drive force is supplied from the first motor 18.

In this process, because the electric power is supplied while avoiding the voltage converter 14, the reduced efficiency caused by power consumption at the voltage converter 14 can be avoided.

Also in this case, control is preferably performed such that the maximum efficiency can be obtained by the system as a whole by taking into account the single cell efficiency of the fuel cell (the first electric power supply 10), the charge and discharge efficiency of the secondary cell (the second electric power supply 12), and the conversion efficiency of the voltage converter 14.

Further, similarly as in step S14, for a four-wheel drive, the second motor 22 may be driven by supplying electric power from the first electric power supply 10 via the voltage converter 14 as required.

As described above, according to this embodiment, driving of a motor can be accomplished under all conditions according to the required electric power Wx, without using the voltage converter. That is, by providing, for each of multiple electric power supplies, a drive motor connected via the voltage converter and a drive motor connected while avoiding the voltage converter, electric power can be supplied from each electric power supply to at least one drive motor without using the voltage converter. Therefore, load distribution can be performed while considering both the high-efficiency output range of each electric power supply and the loss at the voltage converter. Because supplying electric power via the voltage converter incurs a loss in the transmitted power, efficiency of the system can be enhanced by supplying electric power from multiple electric power supplies while avoiding the voltage converter if the maximum output power of each of the multiple electric power supplies is not exceeded.

Process in Special Conditions

Figure 4:
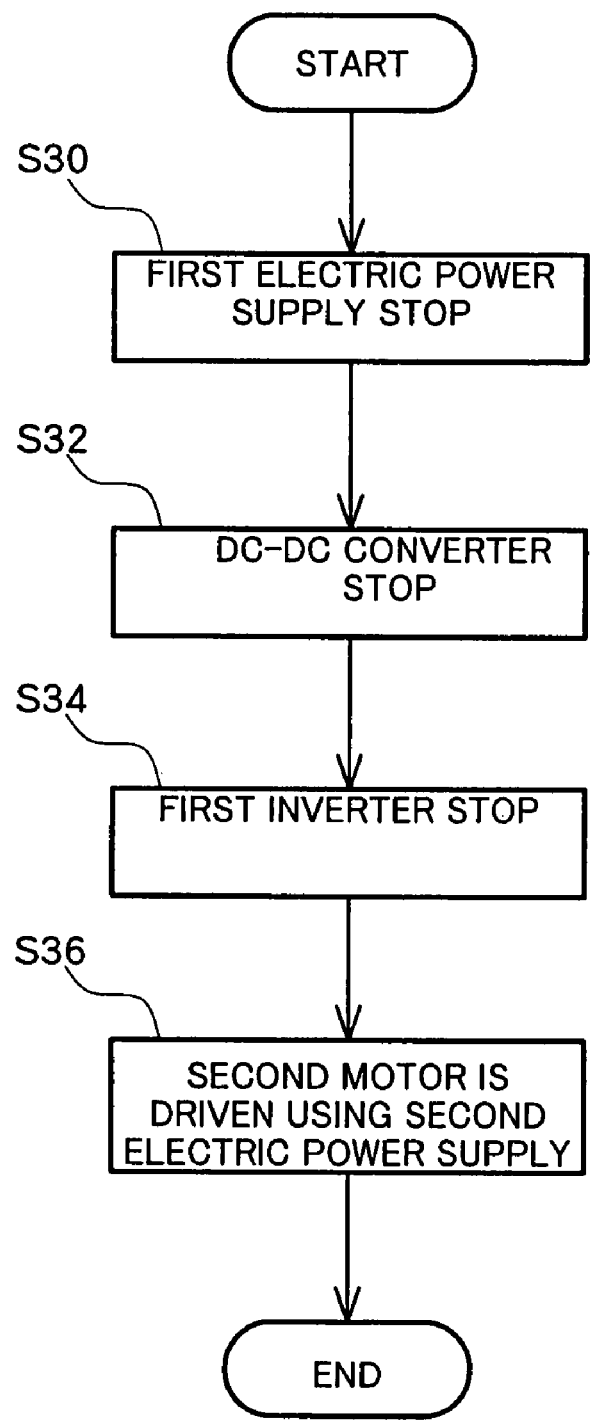
FIG. 4 is a flowchart showing a process in an embodiment of the present invention in the event of a malfunction in an electric power supply.

Next, an example of control in the event of a malfunction in the system will be explained while referring to the flowchart shown in FIG. 4. The control circuit 24 receives a power measurement signal from the first electric power supply 10. If the output power from the first electric power supply 10 is greater than or equal to the predetermined abnormal threshold value $W_{AB1}$, the control circuit 24 starts the control described below. Such trouble may occur when, for example, a semiconductor element included in the voltage converter 14 malfunctions.

In step S30, output from the first electric power supply 10 is halted. The controller 24 determines that a malfunction has occurred in the first electric power supply 10 if the output power from the first electric power supply 10 is greater than or equal to the predetermined abnormal threshold value $W_{AB1}$, and sends a control signal to the first electric power supply 10 to halt the supply to the first electric power supply 10 of at least one of the fuel gas or the oxidant gas.

In step S32, the voltage converter 14 is stopped. The controller 24 sends a stop signal to the voltage converter 14 to stop the voltage conversion of the voltage converter 14. In this way, the first motor 18 which is connected to the first electric power supply 10 not via the voltage converter 14 is stopped.

In step S34, the first inverter circuit 16 is stopped. The controller 24 sends a stop signal to the first inverter circuit 16 to halt operation.

In step S36, the second motor 22 is driven by the supply of electric power from the second electric power supply 12. The control circuit 24 ascertains whether or not the required electric power Wx is less than or equal to the maximum output value $W_{2MAX}$. If it is determined that the required electric power Wx is less than or equal to the maximum output value $W_{2MAX}$, the control circuit 24 instructs the second electric power supply 12, by sending a control signal to the second electric power supply 12, to supply DC power of the required electric power Wx to the second inverter circuit 20. If the required electric power Wx is greater than the maximum output value $W_{2MAX}$, the control circuit 24 instructs the second electric power supply 12, by sending a control signal to the second electric power supply 12, to supply the DC power of the maximum output value $W_{2MAX}$ to the second inverter circuit 20. The second inverter circuit 20 converts the DC power to three-phase AC power before supplying the electric power to the second motor 22. In this manner, as long as the second electric power supply 12 can supply sufficient electric power, a required minimum drive force can be supplied from the second motor 22.

In this process, because the electric power can be supplied without using the voltage converter 14, an efficiency drop caused by power consumption at the voltage converter 14 can be avoided, thereby enabling an efficient emergency process in the event of equipment trouble.

Figure 5:
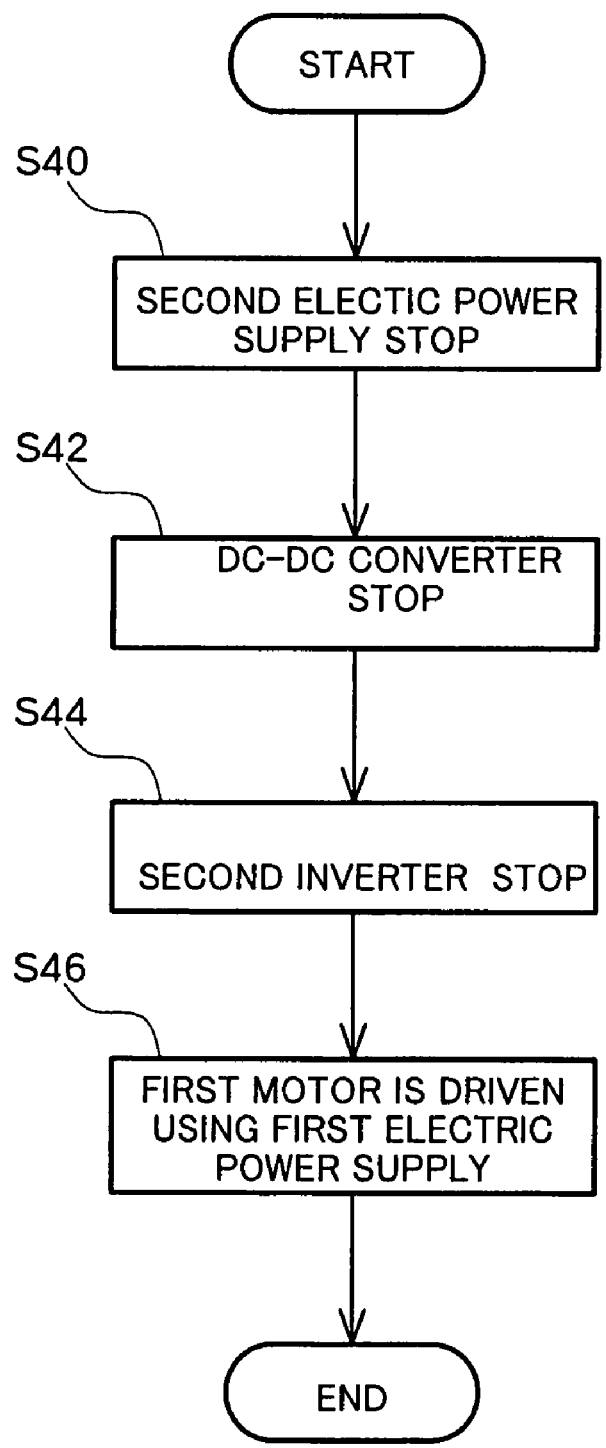
FIG. 5 is a flowchart showing a process in an embodiment of the present invention in the event of a malfunction in an electric power supply.

Next, an example of control in the event of a malfunction in the second electric power supply 12 will be explained by referring to a flowchart shown in FIG. 5. If the output power measurement signal received from the second electric power supply 12 is greater than or equal to the predetermined abnormal threshold value $W_{AB2}$, the control circuit 24 starts the control below. Such a malfunction may occur, for example, when a semiconductor element included in the voltage converter 14 malfunctions.

At step S40, output from the second electric power supply 12 halted. The controller 24 determines that a malfunction has occurred in the second electric power supply 12 if the output power from the second electric power supply 12 is greater than or equal to the predetermined abnormal threshold value $W_{AB2}$, and sends a control signal to the second electric power supply 12 to stop the output from the second electric power supply 12.

At step S42, the voltage converter 14 is stopped. The controller 24 sends a stop signal to the voltage converter 14 to suspend the voltage conversion in the voltage converter 14. In this manner, the second motor 22 which is connected to the second electric power supply 12 not via the voltage converter 14 is stopped. At step S44, the second inverter circuit 20 is stopped. The controller 24 sends a stop signal to the second inverter circuit 20 to suspend operation.

At step S46, the first motor 18 is driven by electric power supplied from the first electric power supply 10. The control circuit 24 determines whether or not the required electric power Wx is less than or equal to the maximum output value $W_{1MAX}$. If the required electric power Wx is less than or equal to the maximum output value $W_{1MAX}$, the control circuit 24 instructs the first electric power supply 10, by sending a control signal to the first electric power supply 10, to supply the DC power of the required electric power Wx to the first inverter circuit 16. If the required electric power Wx is greater than the maximum output value $W_{1MAX}$, the control circuit 24 instructs the first electric power supply 10, by sending a control signal to the first electric power supply 10, to supply the DC power of the maximum output value $W_{1MAX}$ to the first inverter circuit 16. The first inverter circuit 16 converts the DC power to three-phase AC power before supplying the electric power to the first motor 18. In this way, a required minimum drive force can be supplied from the first motor 18.

In this process, because the electric power can be supplied while avoiding the voltage converter 14, the reduction in efficiency caused by power consumption at the voltage converter 14 can be avoided, resulting in a more efficient emergency process in the event of a malfunction. That is, if trouble occurs in one of the electric power supplies, electric power is supplied into at least one of the drive motors from a normally-operating electric power supply among the multiple electric power supplies. Through this process, the electric power is supplied preferentially to a drive motor which is connected to a normally-operating electric power supply, not via the voltage converter. In this way, if multiple electric power supplies are required to be stopped, at least one drive motor can continue to be driven by supplying electric power from another electric power supply. Also in this case, by driving a drive motor which is connected to a normally-operating electric power supply while avoiding the voltage converter, a loss at the voltage converter can be avoided.

Example Modification

Figure 6:
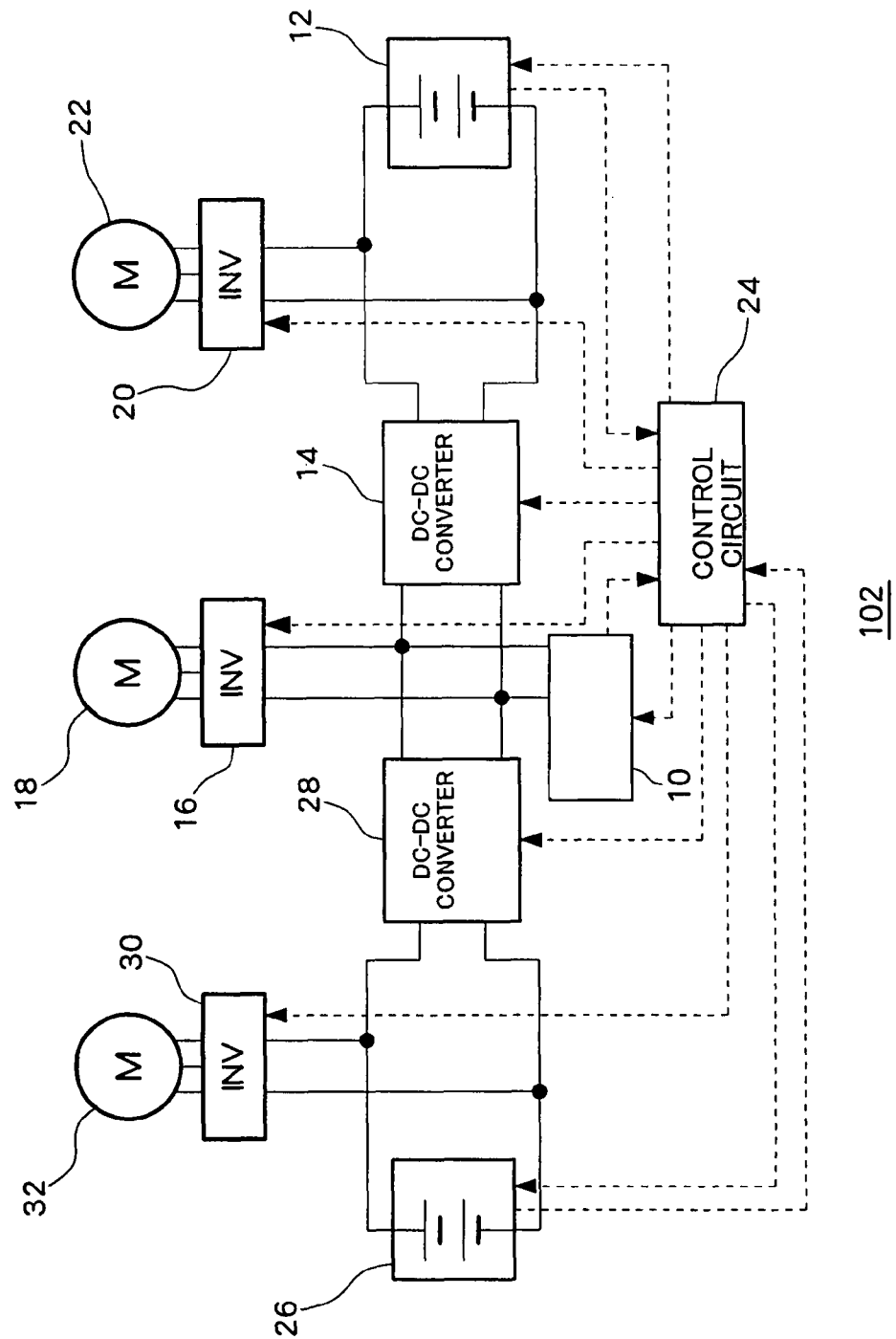
FIG. 6 is a configuration diagram of a modified electric power supply system according to an embodiment of the present invention.

The present invention can be applied to an electric power system and a vehicle having two or more electric power supplies. For example, as shown in FIG. 6, the present invention can be applied to an electric power system 102 in which three electric power supplies 10, 12, 26 are connected each other via two voltage converters 14, 28.

Here, the third electric power supply 26 is a DC power supply which is used as an auxiliary power supply of the electric power system 102. Often, the third electric power supply 26 is an electric power supply having different output voltage from the output voltage of the first electric power supply 10. The third electric power supply 26 is preferably a secondary cell which can charge and discharge regenerated energy from a motor and an excessive electric power from the first electric power supply 10. The third electric power supply 26 is configured in such a manner that the output power is controllable according to a control signal from the control circuit 24. The third electric power supply 26 is provided with a voltage sensor, an electric current sensor, or the like. These sensors measure power output from the third electric power supply 26, and a measurement signal is output into the control circuit 24.

A third inverter circuit 30 is configured to include a circuit for converting DC power to three-phase AC power. The third inverter circuit 30 is configured to be able to start and stop a DC-AC conversion according to a control signal from the control circuit 24. The third motor 32 is a synchronous motor driven by the three-phase AC power. The third motor 32 is configured to be able to be started and stopped according to a control signal from the control circuit 24.

The third electric power supply 26 is connected to the third motor 32 via the third inverter circuit 30. An output from the third motor 32 is transmitted to an axle of a vehicle via a transmission, clutch, or the like which is used for changing a rotational ratio. For example, a six-wheel drive vehicle can be configured by using the first motor 18, second motor 22, and third motor 32.

The voltage converter 28 is configured to include a DC voltage conversion circuit. The voltage converter 28 is configured such that it can be stopped and started according to a control signal from the control circuit 24. The first electric power supply 10 and the third electric power supply 26 are connected to each other via the voltage converter 28. The voltage converter 14 matches the output voltage from the first electric power supply 10 to the output voltage from the third electric power supply 26 before supplying the electric power into the third inverter circuit 30, while the voltage converter 28 similarly matches the output voltage from the third electric power supply 26 to the output voltage from the first electric power supply 10.

In such a configuration with the first electric power supply 10 used as the primary power supply, the first motor 18 is driven using the first electric power supply 10 if the required electric power Wx is within the high-efficiency output range $W_{RNG}$ of the first electric power supply 10. If the required electric power Wx is out of the high-efficiency output range $W_{RGN}$ of the first electric power supply 10, a portion of the load of the required electric power Wx is distributed to the second electric power supply 12 and to the third electric power supply 26 to an extent not exceeding the maximum output power of the second electric power supply 12 and the third electric power supply 26.

In the event of malfunction in any of the electric power supplies, a motor is driven using the remaining electric power supplies. In so doing, the power drain of the voltage converter can still be avoided by driving a motor connected to a normally-operating electric power supply while avoiding the voltage converter.

Figure 7:
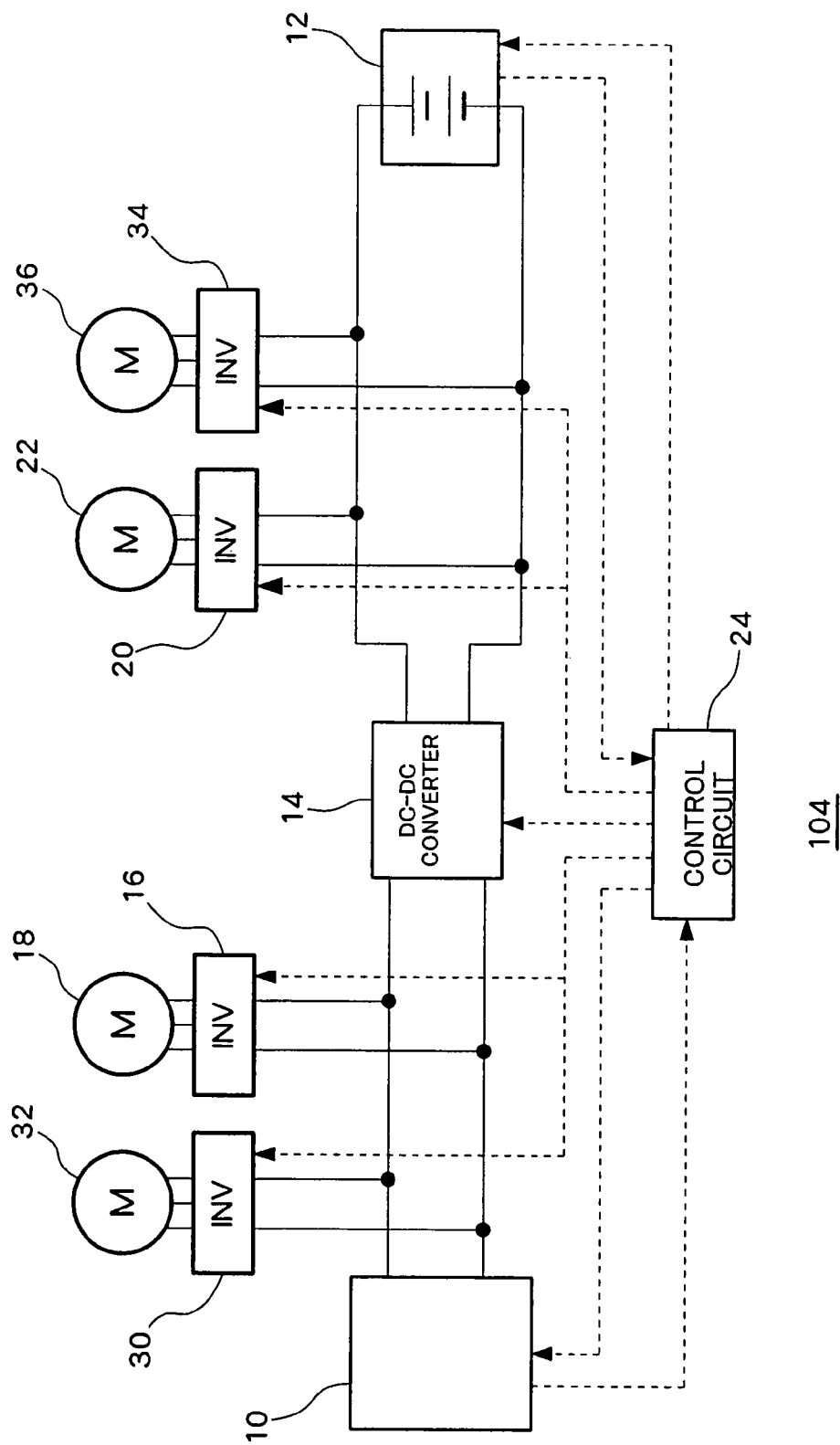
FIG. 7 is a configuration diagram of a modified electric power supply system according to an embodiment of the present invention.

Further, a configuration in which three or more motors are driven by using two electric power supplies may be employable. For example, an electric power supply system 104 as shown in FIG. 7, in which two electric power supplies 10, 12 are connected to four motors 18, 22, 32, 36 via four inverter circuits 16, 20, 30, 34 may be employed. In the configuration shown in FIG. 7, the first motor 18 and the third motor 32 are connected to the first electric power supply 10 via a path that avoids the voltage converter 14, while the second motor 22 and the fourth motor 36 are connected to the first electric power supply 10 via the voltage converter 14. On the other hand, the second motor 22 and the fourth motor 36 are connected to the second electric power supply 12 via a path which avoids the voltage converter 14, while the first motor 18 and the third motor 32 are connected to the second electric power supply 12 via the voltage converter 14.

By employing a configuration as described, the first motor 18 and the third motor 32 can be operated in a similar manner as the first motor 18 in the previous example, while the second motor 22 and the fourth motor 36 can be operated in a similar manner as the second motor 22. By applying the electric power system of the present invention to a vehicle, an efficient electric automobile or hybrid automobile can be realized. Furthermore, drive stability and reliability can both be enhanced.

The invention claimed is:

1. An electric power supply system comprising:
   a plurality of drive motors;
   a bidirectional electric power converter for converting a DC voltage; and
   a plurality of electric power supplies with mutually different output voltages for supplying electric power to the plurality of drive motors,
   wherein each of the plurality of electric power supplies is connected to at least one of the plurality of drive motors by a path that does not include the bidirectional electric power converter, and also to at least one of the plurality of drive motors by a path that does include the bidirectional electric power converter; and
   when an abnormal output is obtained from at least one of the plurality of electric power supplies, the output from the electric power supply with the abnormal output and the power conversion of the bidirectional electric power converter are both suspended in order to supply electric power from an electric power supply other than the one with the abnormal output to at least one of the plurality of drive motors via a path that does not include the bidirectional electric power converter.

2. The electric power supply system according to claim 1, wherein
   at least one of the plurality of electric power supplies is an electric power generation means; and
   a controller is provided for distributing a load for each of the plurality of electric power supplies in such a manner that the power output by the electric power generation means is within a predetermined high-efficiency output range.

3. The electric power supply system according to claim 1, wherein
   at least one of the plurality of electric power supplies is a fuel cell; and
   a controller is provided for distributing a load for each of the plurality of electric power supplies in such a manner that the power output by the fuel cell is within a predetermined high-efficiency output range.

4. The electric power supply system according to claim 3, wherein
   when a required electric power for the plurality of drive motors is within or greater than the high-efficiency output range, the controller instructs an electric power supply other than a fuel cell among the plurality of electric power supplies to supply electric power to at least one of the plurality of drive motors.

5. The electric power supply system according to claim 4, wherein
   the controller instructs an electric power supply other than a fuel cell among the plurality of electric power supplies to supply electric power to at least one of the plurality of drive motors via a path that does not include the bidirectional electric power converter.

6. The electric power supply system according to claim 4, wherein
   when the required electric power is not greater than the maximum output power of the electric power supplies among the plurality of electric power supplies which are not fuel cells, the controller instructs only an electric power supply other than a fuel cell among the plurality of electric power supplies to supply electric power to at least one of the plurality of drive motors.

7. The electric power supply system according to claim 4, wherein
   when the required electric power is greater than the maximum output power of the electric power supplies among the plurality of electric power supplies which are not fuel cells, the controller instructs the fuel cell to supply the additional required electric power to at least one of the plurality of drive motors.

8. The electric power supply system according to claim 7, wherein
   the controller instructs the fuel cell to supply electric power to at least one of the plurality of drive motors via a path that does not include the bidirectional electric power converter.

9. The electric power supply system according to claim 1, wherein
   at least one of the plurality of electric power supplies is a secondary cell which can be charged and discharged; and
   a load of output power is distributed to each of the plurality of electric power supplies based on a charge status of the secondary cell in such a manner that the maximum output power of the secondary cell is not exceeded.

10. A vehicle comprising:
    a plurality of drive motors;
    a bidirectional electric power converter for converting a DC voltage; and
    a plurality of electric power supplies with mutually different output voltages for supplying the plurality of drive motors,
    wherein each of the plurality of electric power supplies is connected to at least one of the plurality of drive motors by a path that does not include the bidirectional electric power converter, and also to at least one of the plurality of drive motors by a path that does include the bidirectional electric power converter; and
    when an abnormal output is obtained from at least one of the plurality of electric power supplies, the output from the electric power supply with the abnormal output and the power conversion of the bidirectional electric power converter are both suspended in order to supply electric power from an electric power supply other than the one with the abnormal output to at least one of the plurality of drive motors via a path that does not include the bidirectional electric power converter.

11. The vehicle according to claim 10, wherein
at least one of the plurality of drive motors is used for driving front wheels and at least one of the plurality of drive motors is used for driving rear wheels.
12. The vehicle according to claim 10, wherein
at least one of the plurality of electric power supplies is a fuel cell; and
a controller is provided for distributing a load for each of the plurality of electric power supplies in such a manner that power output by the fuel cell is within a predetermined high-efficiency output range.
13. The vehicle according to claim 12, wherein
when a required electric power for the plurality of drive motors is greater than or within the high-efficiency output range, the controller instructs an electric power supply other than a fuel cell among the plurality of electric power supplies to supply electric power to at least one of the plurality of drive motors.
14. The vehicle according to claim 13, wherein
the controller instructs an electric power supply other than a fuel cell among the plurality of electric power supplies to supply electric power to at least one of the plurality of drive motors via a path that does not include the bidirectional electric power converter.
15. The vehicle according to claim 13, wherein
when the required electric power is not greater than maximum output power of the electric power supplies among the plurality of electric power supplies which are not fuel cells, the controller instructs only an electric power supply other than a fuel cell among the plurality of electric power supplies to supply electric power to at least one of the plurality of drive motors.
16. The vehicle according to claim 13, wherein
when the required electric power is greater than maximum output power of the electric power supplies among the plurality of electric power supplies which are not fuel cells, the controller instructs the fuel cell to supply the additional required electric power to at least one of the plurality of drive motors.
17. The vehicle according to claim 16, wherein
the controller instructs the fuel cell to supply electric power to at least one of the plurality of drive motors via a path that does not include the bidirectional electric power converter.
18. The vehicle according to claim 10, wherein
at least one of the plurality of electric power supplies is a secondary cell which can be charged and discharged; and
a load of output power is distributed to each of the plurality of electric power supplies based on a charge status of the secondary cell in such a manner that the maximum output power of the secondary cell is not exceeded.

\* \* \* \* \*